United States Patent
Bendelac et al.

(10) Patent No.: US 9,690,558 B2
(45) Date of Patent: Jun. 27, 2017

(54) ORCHESTRATING THE LIFECYCLE OF MULTIPLE-TARGET APPLICATIONS

(71) Applicant: SAP Portals Israel Ltd., Ra'anana (IL)

(72) Inventors: Chaim Bendelac, Kfar Saba (IL); Klaus Kopecz, Walldorf (DE); Lior Okman, Tzoran-Kadima (IL)

(73) Assignee: SAP Portals Israel Ltd, Ra'anana (IL)

( * ) Notice: Subject to any disclaimer, the term of this patent is extended or adjusted under 35 U.S.C. 154(b) by 0 days.

(21) Appl. No.: 14/879,565

(22) Filed: Oct. 9, 2015

(65) Prior Publication Data
US 2017/0060557 A1    Mar. 2, 2017

Related U.S. Application Data

(60) Provisional application No. 62/213,346, filed on Sep. 2, 2015.

(51) Int. Cl.
G06F 9/445    (2006.01)
H04L 29/08    (2006.01)

(52) U.S. Cl.
CPC ............... *G06F 8/60* (2013.01); *H04L 67/34* (2013.01)

(58) Field of Classification Search
CPC ........................................................ G06F 8/60
USPC ........................................................ 717/175
See application file for complete search history.

(56) References Cited

U.S. PATENT DOCUMENTS

| | | | |
|---|---|---|---|
| 7,653,902 B2 * | 1/2010 | Bozak | G06F 8/61 717/103 |
| 7,752,067 B2 | 7/2010 | Fotteler et al. | |
| 7,788,124 B2 | 8/2010 | Fotteler et al. | |
| 8,285,584 B2 | 10/2012 | Fotteler et al. | |
| 8,370,184 B2 | 2/2013 | Fotteler et al. | |
| 8,370,185 B2 | 2/2013 | Fotteler et al. | |
| 8,392,231 B2 | 3/2013 | Fotteler et al. | |
| 8,639,548 B2 | 1/2014 | Fotteler et al. | |
| 2007/0250575 A1 * | 10/2007 | Tseitlin | G06F 8/30 709/205 |
| 2010/0042986 A1 * | 2/2010 | Greiner | G06F 8/61 717/174 |
| 2015/0006730 A1 | 1/2015 | Helfman et al. | |
| 2015/0007126 A1 | 1/2015 | Koutyrine et al. | |

* cited by examiner

*Primary Examiner* — Wei Zhen
*Assistant Examiner* — Lanny Ung
(74) *Attorney, Agent, or Firm* — Fish & Richardson P.C.

(57) ABSTRACT

The present disclosure involves systems, software, and computer implemented methods for deploying a multiple target application (MTA). One example method includes identifying a MTA for deployment. The MTA includes one or more software modules and is associated with a deployment descriptor that identifies at least one dependency associated with the one or more software modules. One or more target platforms are identified for deployment of the MTA. The one or more software modules are deployed on the one or more target platforms. Deploying the one or more software modules includes implementing the at least one dependency identified in the deployment descriptor.

14 Claims, 9 Drawing Sheets

716

718 — ID: com.example123.mta.sample
719 — version: 1.2.1-beta

720 — modules:
722 — - name: pricing-ui
724 —   type: javascript.nodejs
  parameters:
726 {   host: www
    domain: bestprice.example123.com
728 — requires:
730 — - name: price_opt
  group: DESTINATIONS
  properties:
    name: internal
742 — url_path: ~{url_base}/odata/
743 — - name: competitor_data
  group: DESTINATIONS
  properties:
    name: external
748 {   url: ~{url}
    api_keys: ~{keys}

736 — - name: pricing-backend
738 — type: java.tomcat
734 — provides:
732 — - name: price_opt
  properties:
740 — url_base: ${host}.${domain}
  requires:
750 — - name: cloudStorage 745 — resources:
752 — - name: cloudStorage
754 — type: org.cf.s3-cf-service
744 — - name: competitor_data
746 {   properties:
    url: "https://example-competitor-data.com/"
    keys:
      app_key:
      secret_key:

FIG. 7B

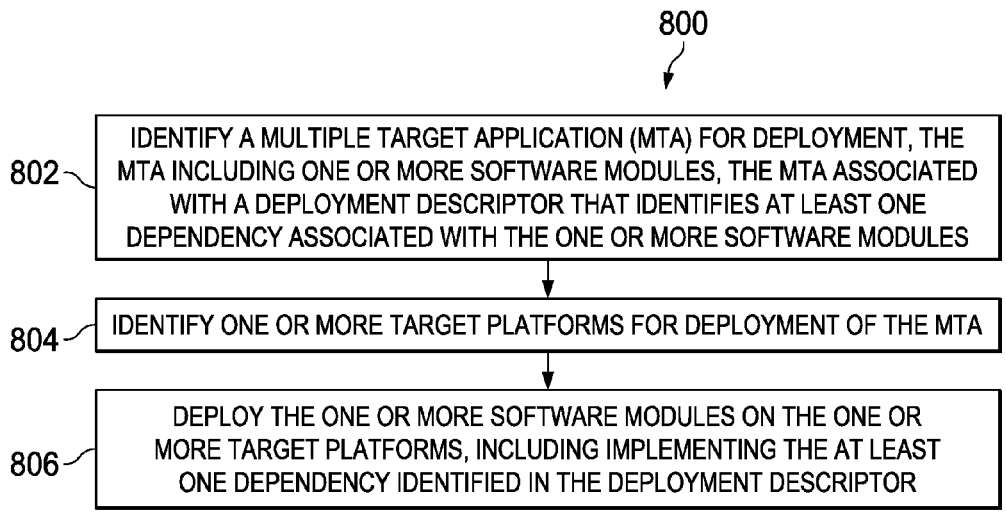

FIG. 7C

```
762 — ID: com.example123.mta.sample.config_dev
764 — extends: com.example123.mta.sample
766 — modules:
770 — - name: pricing-backend
      parameters:
768 {   memory: 128M
        instances: 2
        buildpack: java-test 772 — resources:
774 — - name: cloudStorage
      parameters:
777 —   service-plan: basic 776 — - name: competitor_data
      properties:
780 — keys:
778 {   app_key: 25892e17-80f6
        secret_key: cd171f7c-560d
```

802 — IDENTIFY A MULTIPLE TARGET APPLICATION (MTA) FOR DEPLOYMENT, THE MTA INCLUDING ONE OR MORE SOFTWARE MODULES, THE MTA ASSOCIATED WITH A DEPLOYMENT DESCRIPTOR THAT IDENTIFIES AT LEAST ONE DEPENDENCY ASSOCIATED WITH THE ONE OR MORE SOFTWARE MODULES

804 — IDENTIFY ONE OR MORE TARGET PLATFORMS FOR DEPLOYMENT OF THE MTA

806 — DEPLOY THE ONE OR MORE SOFTWARE MODULES ON THE ONE OR MORE TARGET PLATFORMS, INCLUDING IMPLEMENTING THE AT LEAST ONE DEPENDENCY IDENTIFIED IN THE DEPLOYMENT DESCRIPTOR

FIG. 8

ORCHESTRATING THE LIFECYCLE OF MULTIPLE-TARGET APPLICATIONS

PRIORITY

This application claims priority under 35 USC §119(e) to U.S. Patent Application Ser. No. 62/213,346, filed on Sep. 2, 2015, the entire contents of which are hereby incorporated by reference.

TECHNICAL FIELD

The present disclosure relates to computer-implemented methods, software, and systems for deploying a multiple target application.

BACKGROUND

A service-oriented architecture (SOA) is an architectural pattern which can be used to implement a software application. In a SOA architecture, application components provide services to other components using a communications protocol over a network. A service can be a self-contained unit of functionality that is a discretely invokable operation. As another example, a service can be an interface definition that may list several discrete services/operations. Services can be combined to provide the functionality of a software application. Each respective service can exchange information with other services in the network to achieve the functionality provided by the service.

SUMMARY

The present disclosure involves systems, software, and computer implemented methods for deploying a multiple target application. One example method includes identifying a MTA for deployment. The MTA includes one or more software modules and is associated with a deployment descriptor that identifies at least one dependency associated with the one or more software modules. One or more target platforms are identified for deployment of the MTA. The one or more software modules are deployed on the one or more target platforms. Deploying the one or more software modules includes implementing the at least one dependency identified in the deployment descriptor.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 7B illustrates an example MTA model corresponding to an example MTA.

FIG. 7C illustrates an extension descriptor associated with an example MTA model.

FIG. 8 is a flowchart of an example method for deploying a MTA.

DETAILED DESCRIPTION

An organization can produce a software application, for use by the organization and/or as a software application to sell to other organizations. The software application can be a multi-target application (MTA). A MTA includes multiple software pieces (e.g., "modules"). A module can be dependent on one or more other modules. Each module can provide particular functionality for the software application. The modules can be created by multiple teams working concurrently on different parts of the software application, such as a user interface, database model, business data, and business logic, using different programming models, tools and technologies. The modules can be deployed to different target platforms, such as databases, application servers, web and mobile platforms, etc. Although deployed to different platforms, the modules are all associated with a same lifecycle.

A deployer can perform an orchestration process to coordinate the development, deployment, and distribution of all the modules of a MTA. The deployer can evaluate a technology-independent MTA model to identify logical dependencies between the modules defined within the MTA and subsequently implement the identified logical dependencies while deploying the modules to specific target platforms. The deployer can manage the entire deployment process, which can ensure that the MTA is deployed successfully or that error handling steps are performed if a particular deployment step fails.

Figure 1:
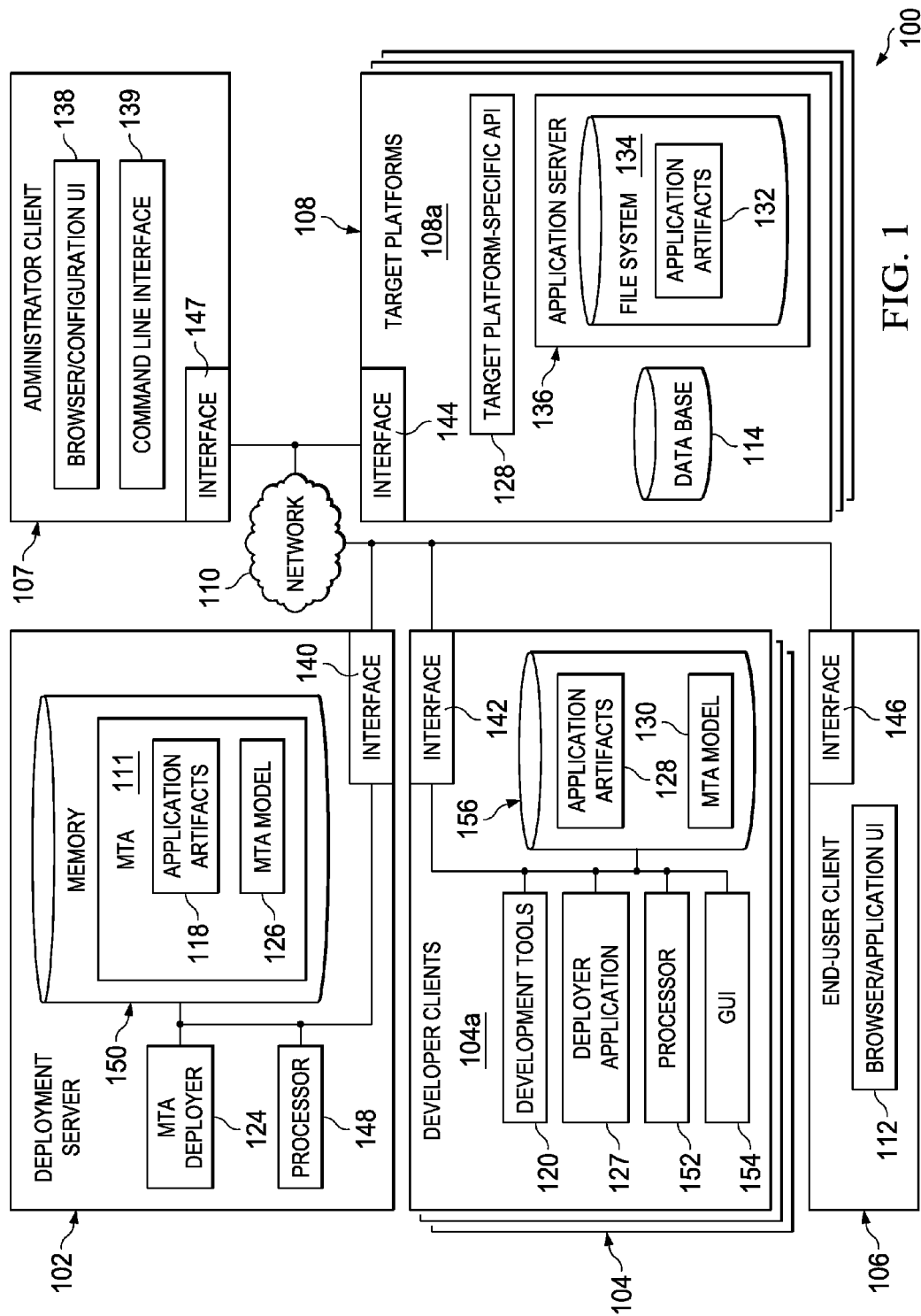
FIG. 1 is a block diagram illustrating an example system for deploying a MTA (Multiple Target Application).

FIG. 1 is a block diagram illustrating an example system 100 for orchestrating the lifecycle of multi-target applications. Specifically, the illustrated system 100 includes or is communicably coupled with a deployment server 102, one or more developer client devices 104, an end-user client device 106, an administrator client device 107, a set of target platforms 108, and a network 110. Although shown separately, in some implementations, functionality of two or more systems or servers may be provided by a single system or server. In some implementations, the functionality of one illustrated system or server may be provided by multiple systems or servers.

An end user can use a browser/application user interface 112 running on the end-user client 106 to access a MTA 111. The MTA 111 can be an application that has been deployed by the deployment server 102 to multiple target platforms 108. Some or all of the target platforms 108 may provide one or more resources for use by the MTA 111. For example, a database 114 is provided by a target platform 108a.

The deployment server 102 can deploy application artifacts 118 associated with the MTA 111 to the target platforms 108. The application artifacts 118 can be, for example, deployable modules of different types that have been developed and built by developers, such as with development tools 120 running on one or more of the developer client devices 104. The application artifacts 118 associated with the MTA 111 can be created by multiple teams working concurrently on different parts of the application, such as the UI, database models, business data, and business logic, using different programming models, tools and technologies. Although the multiple application artifacts 118 can be deployed and executed on different target platforms 108 (e.g., databases, application servers, web and mobile platforms, etc.) the application artifacts 118 each are associated with a same lifecycle of the MTA 111.

An example use of an MTA is for a cloud-based application. In a cloud computing environment, runtime technology and deployment aspects of an application can change over time. For example, a developer might decide to migrate a Java-based implementation of a request processing portion of the application to a node.js-based implementation. As another example, a developer may decide to split a Java module into two Java modules, to be able to scale one feature of the application independently from other features. A cloud-computing environment can introduce complexities involving source code management, consistent builds and testing, connectivity configuration, and deployment orchestration.

To manage complexities with developing and distributing applications in cloud computing and other environments, an organization can use a MTA process that includes technology-independent methods, roles and metadata to be leveraged by tools for developing, distributing, building. and deploying MTAs. The MTA process includes a single application model and a single deployment process, even when the application is spread across multiple target platforms 108. Using an MTA process can result in increased portability and durability due to a target-independent application model. An MTA deployer 124 component can serve as a single and central entity responsible for deploying the MTA 111 and adapting to changes in the runtime infrastructure of the deployed MTA.

The MTA deployer 124 can, when deploying the MTA 111, interpret a MTA model 126 associated with the MTA 111. The MTA model 126 describes logical dependencies between application artifacts 118 and external resources. The MTA model 126 can describe, for example, that a first module provides certain information that is used by a second module. As another example, the MTA model 126 can describe that a third module uses information provided by an external resource. The MTA model 126 is not specific to any technology or target platform 108. The MTA model 126 can be, for example, a descriptor file which can be created manually using a text editor or automatically by an integrated development environment (IDE).

The MTA deployer 124 can interpret the MTA model 126 when the MTA 111 is to be deployed to the target platforms 108. The MTA deployer 124 can translate the MTA model 126 into deployment instructions which are specific to the target platforms 108. For example, the target platforms 108 can each provide an API (Application Programming Interface) 128. The MTA deployer 124 can translate the MTA model 126 into commands provided by the APIs 128. The target-specific APIs 128 can provide functionality such as instantiating containers, pushing runtime artifacts, or creating and/or binding other required resources (e.g. services), to name a few examples.

The MTA deployer 124 can use the APIs 128 to transfer the application artifacts 118 to the target platforms 108*a*. For example, deployed application artifacts 132 have been transferred to a file system 134 associated with the target platform 108*a*. An application server 136 can execute on the target platform 108*a* and can use one or more of the deployed application artifacts 132. In some implementations, the target platforms 108 include multiple application servers. For example, each application server can use one or more of the deployed application artifacts 132.

The MTA deployer 124 can determine whether all of the application artifacts 118 and associated dependencies are initiated, deployed, configured and executed correctly. If a deployment step fails, the MTA deployer 124 can perform error handling in response to an error condition. The MTA deployer 124 can deploy all application artifacts 118 associated with the MTA 111 as a single deployment life cycle step, which can result in ensuring that the MTA 111 is deployed in a correct order and deployed completely (e.g., if all deployment steps complete successfully).

The MTA deployer 124 can be server-based, as shown, and/or a MTA deployer can reside on a developer client device 104 (e.g., as illustrated by a local deployer application 127). Some application artifacts 128 located on a developer client device 104 can be transferred from the developer client device 104 to the deployment server 102 or another server (e.g., a build server) after being built. The MTA model 126 can be developed from the beginning of design and development of the MTA 111. A developer can, for example, check out the MTA model 126 to a workspace on the developer client device 104*a* (e.g., as illustrated by a local MTA model 130). The developer can check in the MTA model 130 as a new MTA model 126. Maintaining the MTA model 126 throughout design and development of the MTA 111 can avoid multiple administrators having to create, maintain, and coordinate multiple complex deployment scripts after development of the MTA 111 has been completed.

As described in more detail below, an administrator can use the administrator client device 107 to configure and trigger a deployment process. For example, the administrator can use a browser/configuration UI 138 or a command line interface 139 to configure the MTA model 126 and/or the MTA deployer 124. The browser/configuration UI 138 and the command line interface 139 can communicate with the deployment server 102, for example.

Although the system 100 is described above as including multiple target platforms 108 and multiple application artifacts 118, in some implementations, the system 100 includes only one target platform 108 (e.g., the target platform 108*a*) and one application artifact 118 (e.g., one module). The MTA model 126 can describe one or more conditions or services that are required by the module. The MTA deployer 124 can deploy the module to the target platform 108*a* and can configure the one or more conditions or services needed by the module. In some implementations, the MTA deployer 124 runs on a target platform 108. For example, a particular target platform 108 can implement an application server that can run the MTA deployer 124.

As used in the present disclosure, the term "computer" is intended to encompass any suitable processing device. For example, although FIG. 1 illustrates a single deployment server 102 and a single end-user client device 106, the system 100 can be implemented using a single, stand-alone computing device, two or more deployment servers 102 or two or more end-user client devices 106. Indeed, the deployment server 102, the developer client devices 104, and the end-user client device 106 may each be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the deployment server 102, the developer client devices 104, and the end-user client device 106 may each be adapted to execute any operating system, including Linux, UNIX, Windows, Mac OS®, Java™, Android™, iOS or any other suitable operating system. According to one implementation, the deployment server 102 may also include or be communicably coupled with an e-mail server, a Web server, a caching server, a streaming data server, and/or other suitable server.

Interfaces 140, 142, 144, 146, and 147 are used by the deployment server 102, the developer client device 104a, the target platform 108a, the end-user client device 106, and the administrator client device 107, respectively, for communicating with other systems in a distributed environment—including within the system 100—connected to the network 110. Generally, the interfaces 140, 142, 144, 146, and 147 each comprise logic encoded in software and/or hardware in a suitable combination and operable to communicate with the network 110. More specifically, the interfaces 140, 142, 144, 146, and 147 may each comprise software supporting one or more communication protocols associated with communications such that the network 110 or interface's hardware is operable to communicate physical signals within and outside of the illustrated system 100.

The deployment server 102 includes one or more processors 148. Each processor 148 may be a central processing unit (CPU), a blade, an application specific integrated circuit (ASIC), a field-programmable gate array (FPGA), or another suitable component. Generally, each processor 148 executes instructions and manipulates data to perform the operations of the server 102. Specifically, the one or more processors 148 execute the functionality required to receive and respond to requests from the developer client device 104a and to execute the MTA deployer 124, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The deployment server 102 includes memory 150. In some implementations, the deployment server 102 includes multiple memories. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the deployment server 102.

The developer client devices 104 and the end-user client devices 106 may each generally be any computing device operable to connect to or communicate with the deployment server 102 via the network 110 using a wireline or wireless connection. In general, the developer client devices 104 and the end-user client device 106 each comprise an electronic computer device operable to receive, transmit, process, and store any appropriate data associated with the system 100 of FIG. 1. The end-user client device 106 can include one or more client applications, including the browser/application UI 112. The developer client device 104a can include one or more client applications, including the development tools 120 and the deployer application 127. A client application is any type of application that allows a respective client device to request and view content on the respective client device. In some implementations, a client application can use parameters, metadata, and other information received at launch to access a particular set of data from the deployment server 102. In some instances, a client application may be an agent or client-side version of the one or more enterprise applications running on an enterprise server (not shown).

The developer client device 104 includes one or more processors 152. Each processor 152 may be a central processing unit (CPU), an application specific integrated circuit (ASIC), a field-programmable gate array (FPGA), or another suitable component. Generally, each processor 152 executes instructions and manipulates data to perform the operations of the developer client device 104. Specifically, each processor 152 executes the functionality required to send requests to the deployment server 102 (or another server) and to receive and process responses from the deployment server 102 (or the other server).

The developer client device 104 and the end-user client device are each generally intended to encompass any client computing device such as a laptop/notebook computer, desktop computer, wireless data port, smart phone, personal data assistant (PDA), tablet computing device, one or more processors within these devices, or any other suitable processing device. For example, the developer client device 104 may comprise a computer that includes an input device, such as a keypad, touch screen, or other device that can accept user information, and an output device that conveys information associated with the operation of the deployment server 102, or the developer client device 104 itself, including digital data, visual information, or a graphical user interface (GUI) 154.

The GUI 154 of the developer client device 104 interfaces with at least a portion of the system 100 for any suitable purpose, including generating a visual representation of the development tools 120 and the deployer application 127. In particular, the GUI 154 may be used to view and navigate various Web pages. Generally, the GUI 154 provides the user with an efficient and user-friendly presentation of business data provided by or communicated within the system. The GUI 154 may comprise a plurality of customizable frames or views having interactive fields, pull-down lists, and buttons operated by the user. The GUI 154 contemplates any suitable graphical user interface, such as a combination of a generic web browser, intelligent engine, and command line interface (CLI) that processes information and efficiently presents the results to the user visually.

Memory 156 included in the developer client device 104 may include any memory or database module and may take the form of volatile or non-volatile memory including, without limitation, magnetic media, optical media, random access memory (RAM), read-only memory (ROM), removable media, or any other suitable local or remote memory component. The memory 156 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the developer client device 104.

There may be any number of developer client devices 104 and end-user client devices 106 associated with, or external to, the system 100. For example, while the illustrated system 100 includes one end-user client device 106, alternative implementations of the system 100 may include multiple end-user client devices 106 communicably coupled to the deployment server 102 and/or the network 110, or any other number suitable to the purposes of the system 100. Additionally, there may also be one or more additional developer client devices 104 and/or end-user client devices 106 external to the illustrated portion of system 100 that are capable of interacting with the system 100 via the network 110. Further, the terms "client" and "client device" may be used interchangeably as appropriate without departing from the scope of this disclosure. Moreover, while the developer client device 104 and the end-user client device 16 are each described in terms of being used by a single user, this disclosure contemplates that many users may use one computer, or that one user may use multiple computers.

Figure 2:
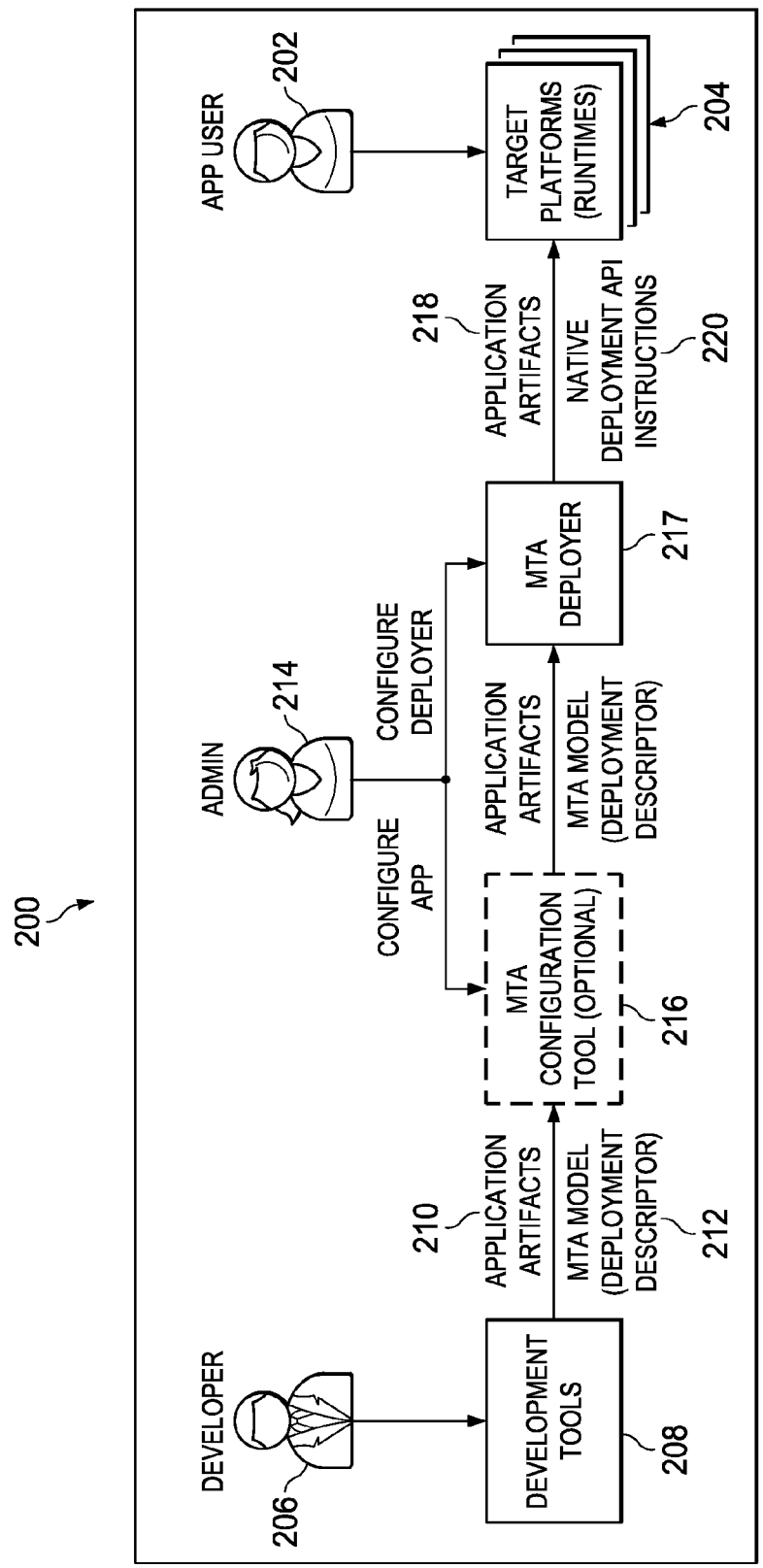
FIG. 2 illustrates an example system for deploying a MTA.

FIG. 2 illustrates an example system 200 for deploying a MTA. Application users 202 can interact with a user interface of a MTA that has modules that have been deployed to multiple target platforms 204. Developers 206 can use development tools 208 to develop and build application artifacts (e.g., modules) 210 for the MTA. The developers 206 can also create a MTA model 212 which describes logical dependencies between the application artifacts 210. An administrator 214 can optionally configure the MTA model 212 using a MTA configuration tool 216. For example, the administrator 214 can configure the MTA deployer 217 by specifying certain target platform instances or parameters to use during deployment. For example, the administrator 214 can configure the MTA deployer 217 to use development or production instances. As another example, the administrator can configure the MTA to use more memory for a production deployment as compared to a development deployment. Although "application users", "administrators", and "developers" are described above as persons, a single person may be associated with one or more pre-defined roles, where a role can be an end-user, administrator, developer, or other role with various permissions associated with each role.

A MTA deployer 217 can, using the MTA model 212 as an input, deploy the application artifacts 210 to the multiple target platforms 204 (e.g., as illustrated by deployed application artifacts 218). For example, the MTA deployer 217 can interpret the MTA model 212 to identify defined dependencies between application artifacts 212 and implement the identified dependencies by invoking one or more native deployment API instructions 220 that are each specific to a particular one of the multiple target platforms 204.

For example, a first module deployed to a first one of the target platforms 204 may need to communicate with a second module deployed to a second one of the target platforms 204. The MTA model 212 can identify or define the need for the two modules to communicate, but does not specify how the modules will actually communicate. The MTA deployer 217 can automatically, without human intervention, implement and configure one or more mechanisms using one or more run time parameters which can enable the first module to communicate with the second module. The result can be, for instance, a URL (Uniform Resource Locator) used for HTTP (HyperText Transfer Protocol)-based communication between modules. The URL can be communicated by the MTA deployer 217 to the second module, by, for example, setting an operating system environment variable.

Figure 3:
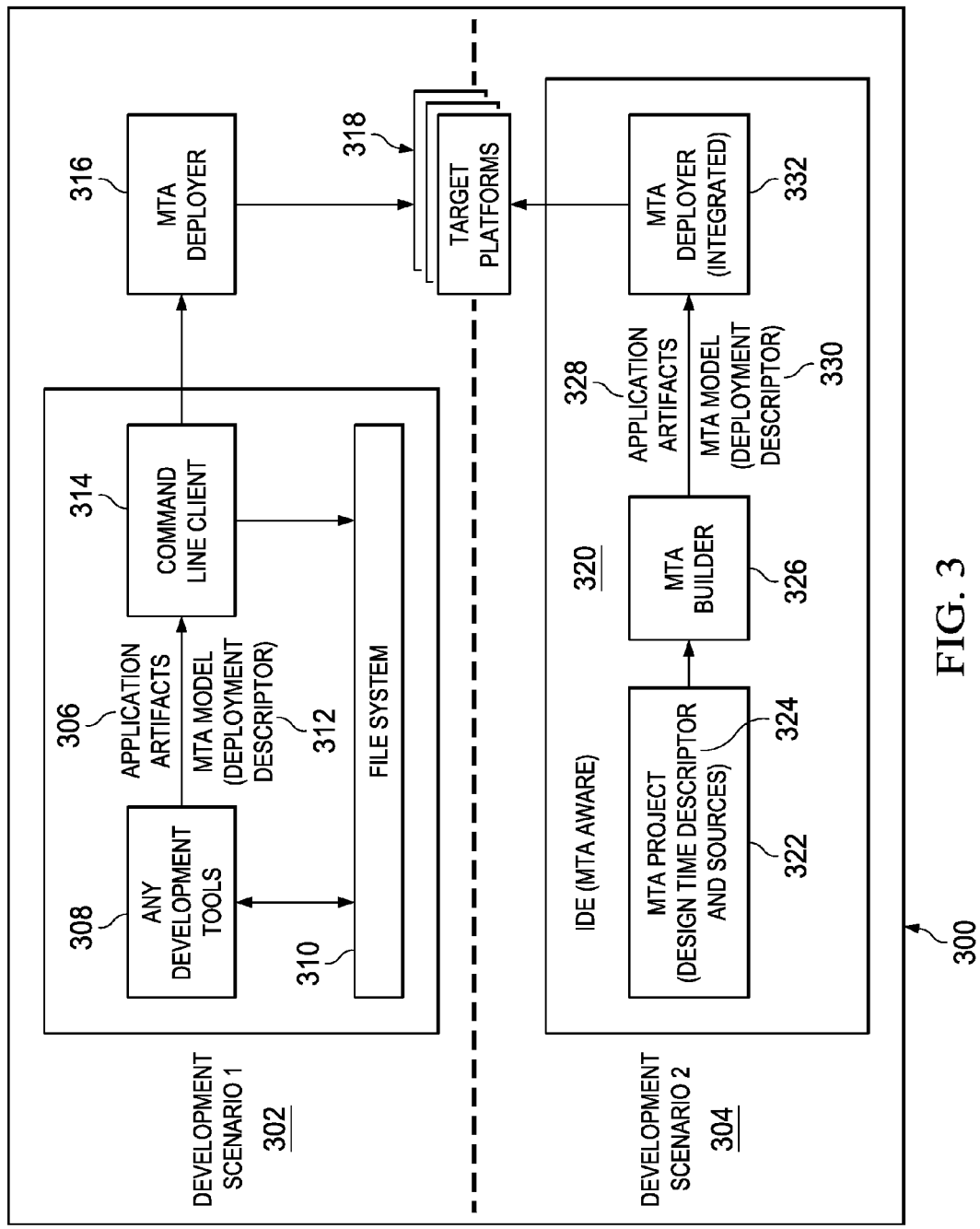
FIG. 3 illustrates first and second example development scenarios for a MTA.

FIG. 3 illustrates a first development scenario 302 and a second development scenario 304 for a MTA. In the first development scenario 302, application artifacts 306 are generated using development tools 308. The development tools 308 can include any development tool and can include multiple, different development tools. The application artifacts 306 can be stored in one or more file systems 310. A MTA model 312 can be generated by a developer, such as using a text editor or some other tool. The MTA model 312 can refer to the locations of the application artifacts 306 in the file system(s) 310. The MTA model 312 can be stored, for example, in a version control system or otherwise stored in the file system(s) 310. A developer can use a command-line client 314 of a MTA deployer 316 to deploy the MTA. The command-line client 314 can access the MTA model 312 and the application artifacts 306 from the file system(s) 310 and send the application artifacts 306 and the MTA model 312 to the MTA deployer 316, using an interface provided by the MTA deployer 316. The MTA deployer 316 can deploy the application artifacts 306 to one or more target platforms 318.

In the second development scenario 304, an IDE (Integrated Development Environment) 320 manages a MTA project 322. Developers use the IDE 320 for developing source modules included in the MTA. The MTA project 322 is used to manage various types of source modules developed for the MTA. Developers can create a design time descriptor 324 (which may be referred to as a MTA project descriptor) which defines the application model, including source type information which can be used to select design and build time tools. A MTA builder 326 included in the IDE 320 can be used to generate deployable application artifacts 328. The MTA builder 326 can refer to the design time descriptor 324, for example, and perform consistency checks and generate the deployable application artifacts based 328 on information included in the design time descriptor 324. The MTA builder 326 can automatically create a final MTA model 330, which describes deployment dependencies between the application artifacts 328. The MTA model 330 can be, can include, or can be associated with a deployment descriptor that defines the relationships and resources required in an MTA deployment. An integrated MTA deployer 332 can deploy the application artifacts 328 to the one or more target platforms 318 and implement the dependencies defined in the MTA model 330 and deployment descriptor.

The use of the MTA project 322 in the second development scenario 304 can result in a more coordinated build and deployment process, as compared to the manual approaches used in the first development scenario 302. For example, build, test, and deployment tasks, including consistency checks, can be automatically ordered and synchronized in the second development scenario 304.

Figure 4:
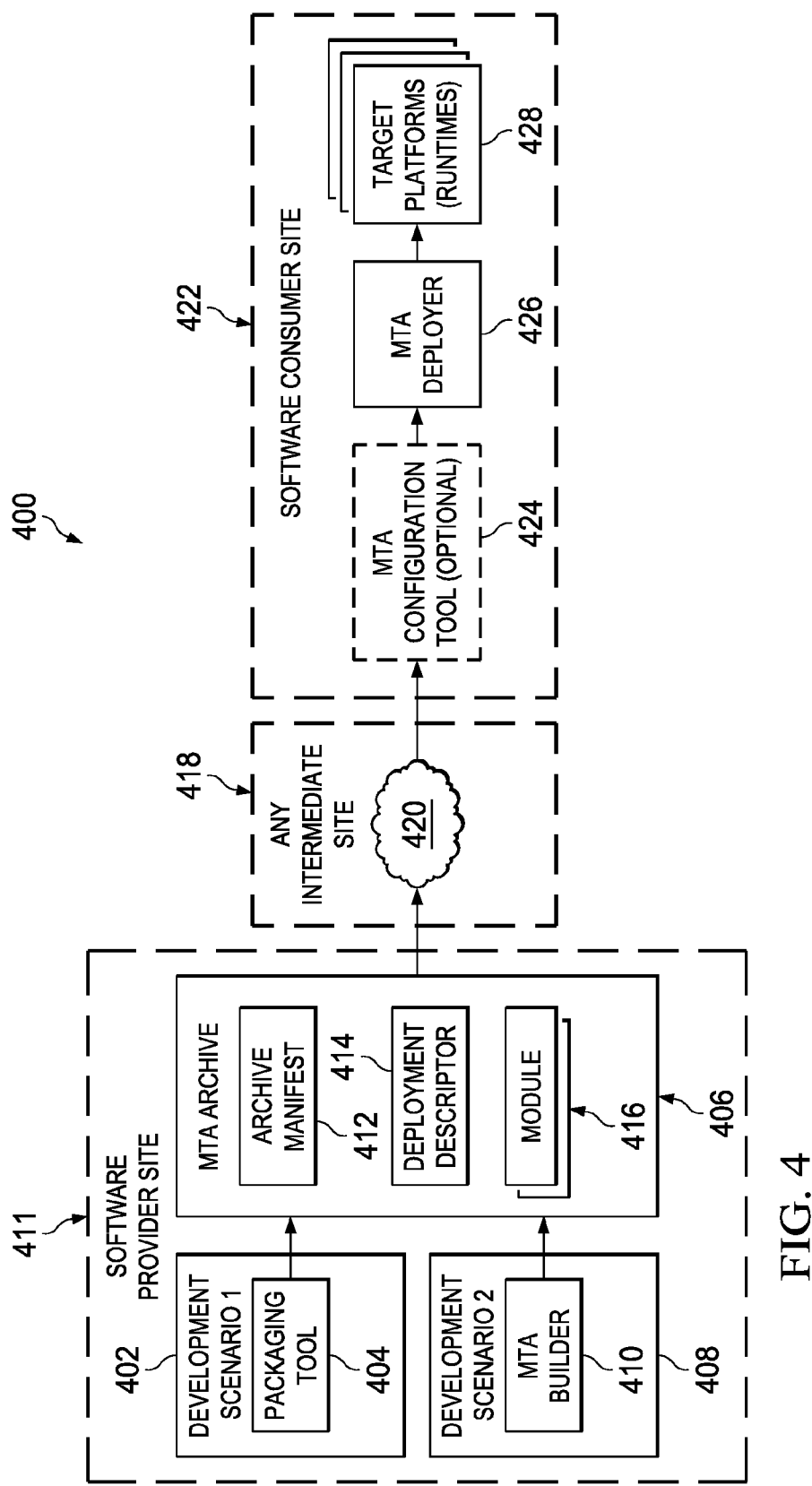
FIG. 4 illustrates an example distribution model for a MTA.

FIG. 4 illustrates a distribution model 400 for a MTA. If a first development scenario 402 (e.g., corresponding to the first development scenario 302 of FIG. 3) is used, a developer can use a packaging tool 404 to create a MTA archive 406. If a second development scenario 408 (e.g., corresponding to the second development scenario 304 of FIG. 3) is used, a MTA builder 410 (e.g., corresponding to the MTA builder 326 of FIG. 3) can create the MTA archive 406. Although two example development scenarios are illustrated in FIGS. 3 and 4, any suitable development scenario may be used to generate the MTA, including techniques other than those described herein. The MTA archive 406 can be created, for example, at a software provider site 411. A version number can be assigned to the MTA archive 406. The MTA archive 406 can include an archive manifest 412 that describes the contents of the MTA archive 406. The MTA archive 406 can include a deployment descriptor 414 (e.g., a MTA model) and a set of deployable modules 416.

The MTA archive 406 can be distributed to an intermediate site 418 (e.g., a software reseller, or an application store accessible over the Internet), such as over a network 420. A software consumer can download a copy of the MTA archive 406, such as to a software consumer site 422. The software consumer can optionally use a MTA configuration tool 424 to configure deployment of the MTA. A MTA deployer 426 can deploy and configure the deployable modules 416 to a set of target platforms (runtimes) 428 according to the deployment descriptor 414.

Figure 5:
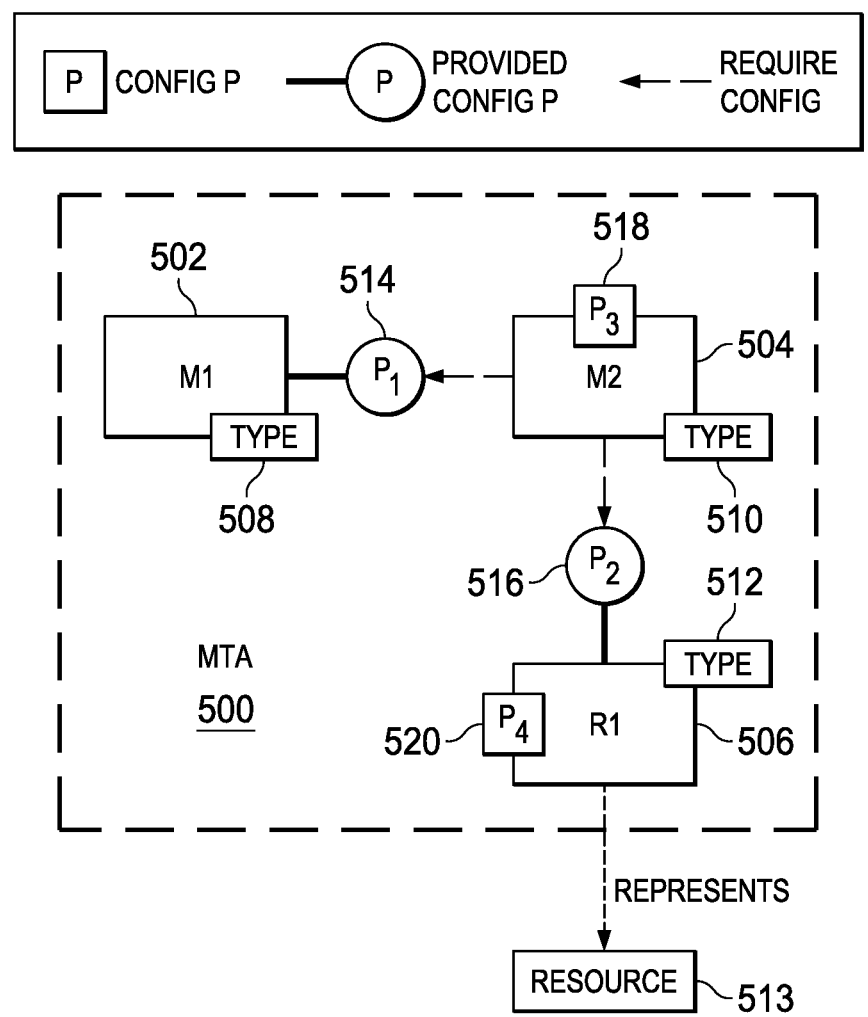
FIG. 5 illustrates an example graphical representation of a MTA model.

FIG. 5 illustrates a graphical representation of an example MTA model 500. The MTA model 500 includes first and second modules 502 and 504 (e.g., "M1" and "M2") and a resource declaration 506 (e.g., "R1"). The first and second modules 502 and 504 are each respectively associated with a module type 508 or 510. The module types 508 and 510 indicate information to a deployer about how to deploy a respective module 502 or 504. For example, the module type 508 may indicate an API and/or API parameters to be used when deploying the module 502. The module types 508 and 510 can indicate a particular runtime to be used for a respective module 502 or 504. The resource declaration 506 is associated with a resource type 512. A deployer can use the resource type 512 to identify one or more actions and/or information for allocating, binding, and/or managing an external resource 513 that is associated with the resource declaration 506.

The second module 504 requires a set of configuration properties 514 (e.g., "P1") that are provided by the first module 502. The second module 504 also requires configuration properties 516 (e.g., "P2") that are provided by the external resource 513 represented by the resource declaration 506. Configuration properties 518 and 520 (e.g., "P3" and "P4") may be associated with the second module 504 and the resource declaration 506, respectively, such as by a configuration process.

As described in more detail below, a deployer can implement the dependencies between the second module 504 and the first module 502, and between the second module 504 and the resource 513. For example, the deployer can make available properties provided by a providing module to a requiring module's runtime. The MTA model 500 does not specify what technical mechanism is used to make the properties of a providing module available to a requiring module. The deployer can determine how to implement the dependency between the requiring module and the providing module.

As an example, the MTA model 500 can indicate that module 502 provides a price optimization API and the module 504 uses the price optimization API. The MTA model 500 does not specify how the module 504 accesses the price optimization API. A deployer can configure the deployed modules 502 and 504 so that the module 504 can access the price optimization API. For example, the deployer can configure the module 504 to use a particular URL to access the price optimization API. The URL may not be known, for example, during development of the modules 502 and 504 but can be known by the deployer when the modules 502 and 504 are deployed.

Figure 6:
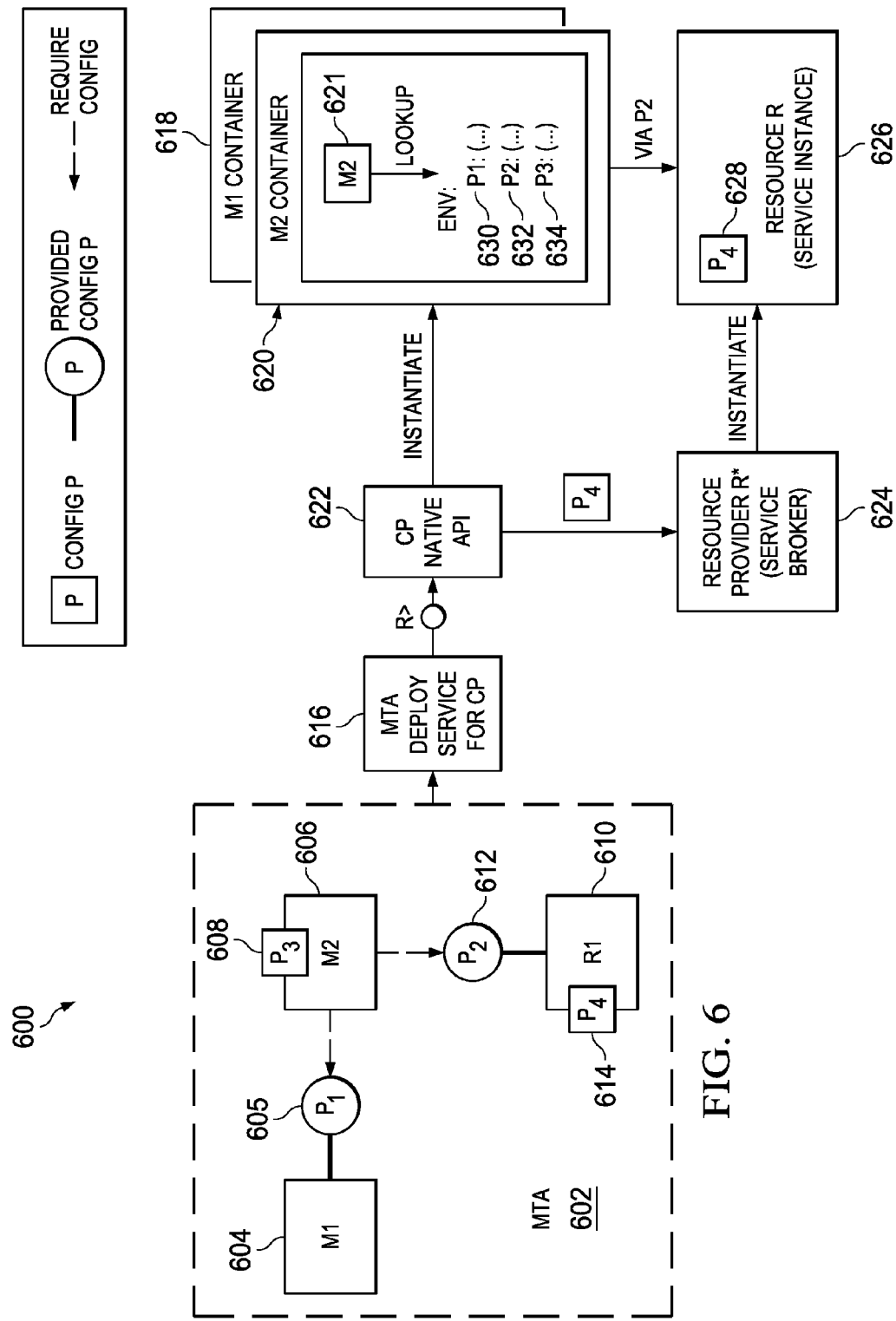
FIG. 6 illustrates an example system in which a MTA is deployed according to a MTA model.

FIG. 6 illustrates an example system 600 in which a MTA is deployed according to a MTA model 602. The MTA model 602 corresponds to the MTA model 500 discussed above with respect to FIG. 5. A first module (e.g. "M1") 604 provides parameters (e.g., "P1") 605 that are required by a second module 606 (e.g., "M2"). Parameters 608 (e.g., "P3") are associated with the second module 606. A resource 610 (e.g., "R1") provides parameters (e.g., "P2") 612 that are required by the second module 606. Parameters 614 are associated with the resource 610.

A MTA deploy service 616 can deploy the MTA associated with the MTA model 602 to multiple containers (e.g., an M1 container 618 and an M2 container 620) of a particular cloud platform (e.g., "CP") environment. Although containers of a particular cloud platform environment are illustrated, the MTA deploy service 616 can deploy the MTA to multiple target platforms or environments of different types.

The MTA deploy service 616 can identify the dependency between the first module 604 and the second module 606 and the dependency between the second module 606 and the resource 610. The MTA deploy service 616 can determine to implement the identified dependencies using operating system environment variables, for example. As another example, the MTA deploy service 616 can use a configuration provisioning service to implement the identified dependencies. For example, the MTA deploy service 616 can provide one or more configuration values to the configuration provisioning service and a particular module can retrieve one or more configuration values from the configuration provisioning service.

The MTA deploy service 616 can invoke CP native API instructions 622 to instantiate the M1 container 618 for the first module 604 and instantiate the M2 container 620 for the second module 606. The M2 container 620 includes the second module 606, for example, as illustrated by a deployed second module 621. The MTA deploy service 616 can invoke the CP native API instructions 622 to create or establish a connection with a resource provider service broker 624. The MTA deploy service 616 (or in some implementations, the resource provider service broker 624) can instantiate a service instance 626 associated with the resource provider service broker 624. The service broker 624 can, for example, create the service instance 626 using the parameter 614 (e.g., as illustrated by parameters 628). The resource provider service broker 622 and the service instance 624 are CP platform-specific components used to provide access to resources in a CP environment, for example.

The MTA deploy service 616 can configure one or more environment variables in one or both of the M1 and M2 containers 618 and 620. For example, the MTA deploy service can create and configure a first environment variable 630 in the M2 container 620. The first environment variable can include, for example, parameter values P1 605 as provided by the description of the module M1 604 in the MTA model 602, The MTA deploy service 616 can create and configure a second environment variable 632, which can contain data required to access service instance 626. The MTA deploy service 616 can create and configure a third environment variable 634, which can contain data as defined by 608 in the MTA model 602.

Figure 7A:
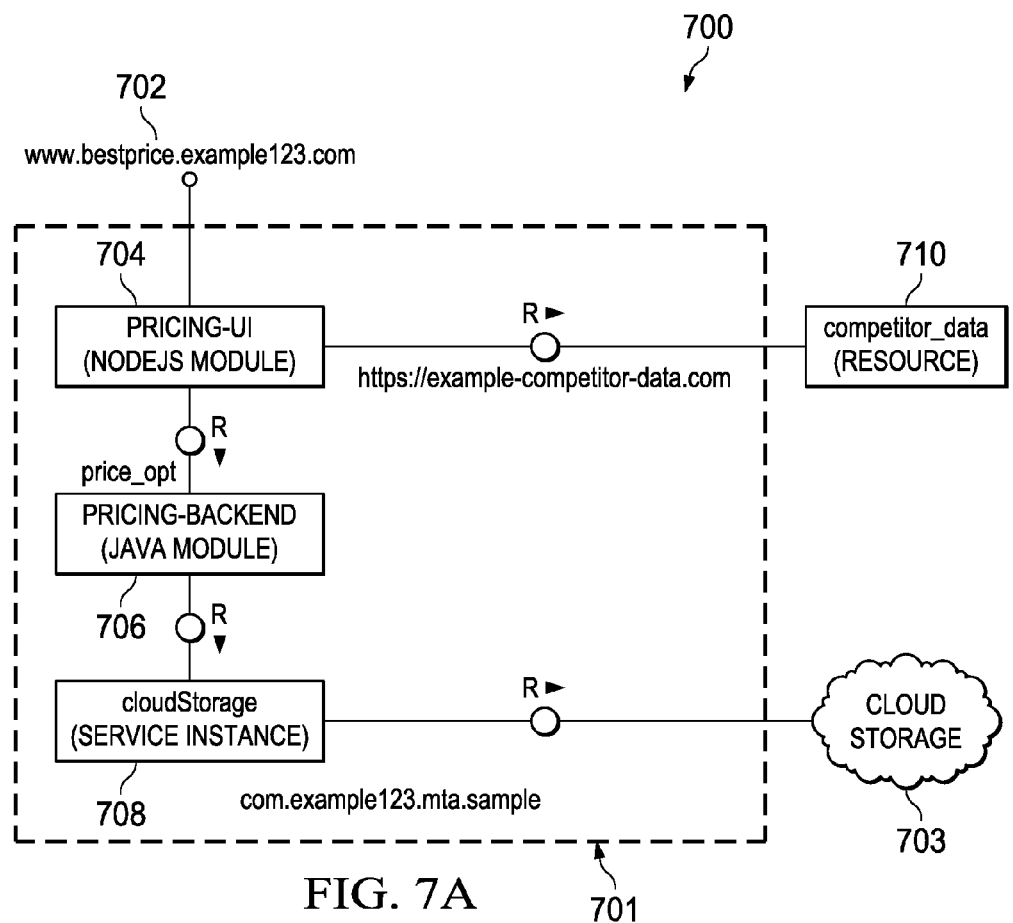
FIG. 7A illustrates an example logical model of an example MTA.

FIG. 7A illustrates an example logical model 700 of an example MTA 701. The MTA 701 can be implemented to provide product price optimization services to retailers. A user interface for the MTA 701 can be accessed using a URL 702. Price optimization can be based on pricing data for a retailer that is stored in a cloud storage service 703. The pricing data can be augmented with data from competitors of the retailer. The competitor data can be obtained from a web service provided by a market research company which collects and analyzes market data.

The MTA includes a first module 704 and a second module 706. The first module 704, which is named "pricing-ui", can serve static UI content. The second module 706, which is named "price_opt", can implement data validation and optimization logic. The second module 706 can access a service instance 708 which is associated with the cloud storage service 703. The first module 704 can communicate with an external web service 710 associated with the market research company.

FIG. 7B illustrates an example MTA model 716 corresponding to the example MTA 701 of FIG. 7A. An identifier 718 can be a unique name that identifies the MTA model 716. A version 719 identifies a particular instance of the MTA model 716. The version 719 can be compared, by a deployer, to a version of a currently-deployed MTA, for example.

A modules section 720 can describe the modules included in the MTA. A first module description 722 corresponds to the first module 704 of FIG. 7A. The first module description 722 includes a module name of "pricing_ui") and a module type 724 (e.g., "javascript.nodejs"). A module parameters section 726 describes parameters associated with the first module 704 (e.g., a host of "www" and a domain of "bestprice.example123.com"). The parameters in the parameters section 726 can be indicators to a deployer for how to deploy the module, for example. A module description can also include properties, which can be data items that are made available to the module at run-time.

A requires section 728 can describe dependencies that the first module 704 has on other modules or on resources. For example, a required name 730 of "price-opt" is included in the requires section 728. A deployer can ensure that a provided properties item with the name of "price_opt" is included in another section of the MTA model 716. For example, a provided properties item 732 is included in a provides section 734 of a second module description 736 corresponding to the second module 706 named "pricing-backend". A datatype 738 of "java.tomcat" for the second module 706 is specified in the module description 736. The provides section 734 indicates that a provided property 740 of the name "url_base" is provided by the second module 706. A value for the provided property 740 is given as "${host}.${domain}" in the MTA model 716. The "$" symbols indicate that "${host}" and "${domain}" are placeholder values, which can, for example, be replaced with actual values by a deployer. The module description 722 for the first module 704 defines a property 742 for use within the first module 704 which is defined using a reference to the provided property 740. For example, the "~" character can be used to refer to a provided property value. That is, the "~{url_base} included in the property 742 can be replaced, by the deployer, with the value of the property 740 provided by the second module 706.

The first module description 722 includes a required properties section 743 named "competitor_data". A "competitor_data" resource 744 corresponding to the required properties section 743 is defined in a resources section 745 of the MTA model 716. Properties with names of "url" and "keys", respectively, are defined for the resource 744 in a provided properties section 746. The "keys" property can be defined using an extension descriptor, as described in more detail below. The required properties section 743 includes required properties 748 which correspond to the provided properties 746. The deployer can, at deployment time, substitute values of "~{url}" and "~{keys}" specified in the required properties 748 with values of corresponding respective provided properties 746.

The second module description 736 includes a required properties 750 named "cloudStorage". A "cloudStorage" resource 752 is defined in the resource section 746. A resource type 754 of "org.cf.s3-cf-service" is defined for the resource 752. The resource type 754 tells the deployer how to access and/or create the resource 752. In the example of FIG. 7B, no properties are attached to 752, because, for example, in a cloud target platform environment, there can be a standard way of passing connection parameters to the requiring module 736. In this example, the passing of parameters can be performed, for example, by the resource provider 624 discussed above with respect to FIG. 6, without requiring further action from the deployer.

FIG. 7C illustrates an extension descriptor 760 associated with the example MTA model 716. The extension descriptor 760 can be used to add information to (e.g., extend) the MTA model 716. An administrator can configure the extension descriptor 760 before the MTA associated with the MTA model 716 is deployed, for example. The extension descriptor 760 can be used to support a particular deployment configuration, such as an individual, developer-specific deployment configuration that can be stored, for example, in a developer-specific workspace. The extension descriptor 760 can be used to complete configuration of a particular deployment of the MTA. Different deployments can be configured using multiple, different extension descriptors, for example. Each of the multiple, different extension descriptors can extend the same deployment descriptor, for example.

Using both deployment descriptors and extension descriptors (e.g., MTA models) can result in separation of references to application artifacts and their dependencies (e.g., in a deployment descriptor) from deployment configuration information (e.g., in an extension descriptor). A deployment descriptor can represent, for example, information that is stable and persistent for a particular version of the MTA. An extension descriptor can represent, for example, information that can change each time the particular version of the MTA is deployed.

An identifier 762 can be a unique name that identifies the extension descriptor 760. The identifier 762 can include the identifier 718 associated with the MTA model 716, for example. The identifier 762 can include additional characters (e.g., ".config.dev") as compared to the identifier 718. The additional characters can be used to describe the extension descriptor 760. An "extends" statement can indicate that the extension descriptor 760 is an extension of the MTA model 716. In some implementations, an extension descriptor can extend another extension descriptor.

The extension descriptor 760 can be used to add properties or parameters to items described in the MTA model 716, for example. As another example, the extension descriptor 760 can be used to add a property or parameter value for a property or parameter that does not have a value in the MTA model 716. For example, a modules section 766 of the extension descriptor 760 includes a parameters section 768 defining additional parameters for a module 770 that is defined in the MTA model 716 (e.g., the module 770 corresponds to the module description 736). The parameters section 768 includes values of "128M" for a memory parameter, "2" for an instances parameter, and "java-test" for a buildpack parameter.

The extension descriptor 760 includes a resources section 772. The resources section 772 includes a resource 774 (e.g., corresponding to the resource 752) and a resource 776 (e.g., corresponding to the resource 744). A value of "basic" is defined for a service-plan parameter 777 for the resource 774. Values for app_key and secret_key sub properties 778 are defined for a keys property 780 for the resource 776.

The values for the app_key and secret_key properties 778 provide values that are left undefined in the MTA model 716. The values for the properties 778 might depend on a concrete deployment scenario, for example. Values for the properties app_key and secret_key can be left blank in the MTA model 716 because an assumption can be made that different credentials are to be used for testing during a development deployment as compared to a productive deployment. Not specifying values for the properties 778 in the MTA model 716 allows for the reuse of the MTA model 716. The MTA model 716 can be used, for example, in a software delivery, such as part of a MTA archive. Values missing from the MTA model 716 can be specified during configuration of particular deployment using a particular extension descriptor, for example.

As another example, an extension descriptor can extend another extension descriptor. For example, a deployment descriptor provided by a software provider can describe application artifacts for a MTA and can specify various properties associated with modules and resources used by the MTA. Some of the properties included in the deployment descriptor can be specified without an initial value. A partner of the software provider can create a first extension descriptor that extends the deployment descriptor provided by the software provider. The first extension descriptor can provide values for some or all of the properties that have no values defined in the deployment descriptor. The partner can define new properties in the first extension descriptor according to a business or technical context associated with the partner. The partner can re-sell the MTA to a customer of the partner. The partner can deploy a production instance of the MTA for the customer and can use a second extension descriptor that extends the first extension descriptor when deploying the production instance. The second extension descriptor can be used for configuration that is specific to the deploying of the production instance for the customer. The second extension descriptor can include values for properties that have not had values defined in either the deployment descriptor or the first extension descriptor, for example. Extension descriptors can be "stacked" using any number of extension descriptors, with each extension descriptor in the stack extending another extension descriptor, except for one extension descriptor in the stack that extends a deployment descriptor.

In some implementations, a deployment descriptor provided, for example, by the software provider, is digitally signed so as to not be modified after being provided to a customer. The customer (e.g., the reseller) can use an extension descriptor to extend the deployment descriptor but cannot directly modify the deployment descriptor, for example. The deployment descriptor can be immutable once delivered, for example. Such an approach can assist in identifying configuration settings present upon delivery of a MTA as compared to configuration settings added or modified after delivery of the MTA.

FIG. 8 is a flowchart of an example method 800 for deploying a multiple target application. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 400 and related methods can be executed by the deployment server 102 of FIG. 1.

At 802, a MTA is identified for deployment. The MTA includes one or more software modules and is associated with a deployment descriptor that identifies at least one dependency associated with the one or more software modules. Each of the one or more software modules can be associated with a type. The type associated with a particular software module can identify a suitable target runtime environment on a particular target platform in which the particular software module can be deployed.

The deployment descriptor can include at least one resource requirement declaration associated with at least one of the software modules. Each resource requirement declaration can identify a resource of a particular resource type, separate from the one or more software modules, that is required for implementation of the MTA at deployment. The deployment descriptor can, for each resource, identify at least one dependency between the resource and at least one of the software modules.

At 804, one or more target platforms are identified for deployment of the MTA. Identifying the one or more target platforms can include identifying, for each of the one or more software modules, a target runtime environment associated with one of the target platforms corresponding to the type of the particular software module. The one or more target platforms can be identified, for example, by identifying an extension descriptor that extends the deployment descriptor and identifying a set of target platforms that are identified in the extension descriptor. Different extension descriptors can each refer to a same deployment descriptor but a different set of target platforms.

At 806, the one or more software modules are deployed on the one or more target platforms. Deploying the one or more software modules includes implementing the at least one dependency identified in the deployment descriptor. Deploying the one or more software modules on the one or more target platforms can include deploying each of the one or more software modules in the identified target runtime environment corresponding to the respective software module. Deploying a particular software module can include translating, based on the type associated with the particular software module, deployment descriptor information associated with the particular software module into target platform-specific instructions corresponding to the identified target runtime environment corresponding to the particular software module. The particular software module can be deployed via a native API associated with the identified target runtime environment associated with the particular software module. Two or more of the software modules can be associated with a different type. Deploying the software modules can include deploying the software modules that have different types to different target runtime environments on different target platforms. Deploying the software modules can include, for each respective resource requirement declaration included in the deployment descriptor, the identifying of a resource corresponding to the resource type associated with the respective resource requirement declaration and the implementing of the at least one dependency between the resource and the software module that is dependent on the resource.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method of deploying a multiple target application (MTA), comprising:
    identifying a MTA for deployment, the MTA including one or more software modules, the MTA associated with a deployment descriptor that identifies at least one dependency associated with the one or more software modules;
    identifying one or more target platforms for deployment of the MTA, wherein identifying the one or more target platforms for deployment includes identifying a first set of one or more target platforms referenced in a first extension descriptor that extends the deployment descriptor and identifying a second set of one or more target platforms included in a second extension descriptor that extends the deployment descriptor, the second extension descriptor being different than the first extension descriptor and the second set of one or more target platforms being different than the first set of one or more target platforms, wherein the first extension descriptor includes a first value for a first property included in the deployment descriptor and the second extension descriptor includes a second value for the first property, the second value being different than the first value, and wherein identifying the one or more target platforms further includes identifying a third extension descriptor that extends the first extension descriptor, wherein the third extension descriptor includes a value for a second property that is included without a value defined in the deployment descriptor; and
    deploying the one or more software modules on the one or more target platforms, wherein deploying the one or more software modules includes implementing the at least one dependency identified in the deployment descriptor, and wherein deploying includes deploying the one or more software modules to the first set of one or more target platforms and to the second set of target platforms.

2. The method of claim 1, wherein each of the one or more software modules are associated with a type, wherein the type associated with a particular software module identifies a suitable target runtime environment on a particular target platform in which the particular software module can be deployed.

3. The method of claim 2, wherein identifying the one or more target platforms for deployment of the MTA includes identifying, for each of the one or more software modules, a target runtime environment associated with one of the one or more target platforms corresponding to the type of the particular software module.

4. The method of claim 3, wherein deploying the one or more software modules on the one or more target platforms includes, for each respective module of the one or more software modules:
    translating, based on the associated type, deployment descriptor information associated with the respective software module into target platform-specific instructions corresponding to the identified target runtime environment corresponding to the respective software module; and
    deploying the respective software module via a native application programming interface (API) associated with the identified target runtime environment associated with the respective software module.

5. The method of claim 3, wherein each of two or more software modules are associated with a different type, and wherein each of the two or more software modules are deployed to a different target runtime environment on different target platforms from each other.

6. The method of claim 1, wherein the deployment descriptor includes at least one resource requirement declaration associated with at least one of the software modules, each resource requirement declaration identifying a resource, separate from the one or more software modules, that is required for implementation of the MTA at deployment, and wherein the deployment descriptor identifies, for each resource, at least one dependency between the resource and at least one software module.

7. The method of claim 6, wherein each of the at least one resource requirement declarations is associated with a resource type, and wherein deploying the one or more software modules on one or more target platforms includes:
    for each respective resource requirement declaration:
        identifying a resource corresponding to the resource type associated with the respective resource requirement declaration; and
        implementing the at least one dependency between the resource and the at least one of the software modules.

8. A system comprising:
one or more computers; and
a computer-readable medium coupled to the one or more computers having instructions stored thereon which, when executed by the one or more computers, cause the one or more computers to perform operations comprising:
    identifying a MTA (Multiple Target Application) for deployment, the MTA including one or more software modules, the MTA associated with a deployment descriptor that identifies at least one dependency associated with the one or more software modules;

identifying one or more target platforms for deployment of the MTA, wherein identifying the one or more target platforms for deployment includes identifying a first set of one or more target platforms referenced in a first extension descriptor that extends the deployment descriptor and identifying a second set of one or more target platforms included in a second extension descriptor that extends the deployment descriptor, the second extension descriptor being different than the first extension descriptor and the second set of one or more target platforms being different than the first set of one or more target platforms, wherein the first extension descriptor includes a first value for a first property included in the deployment descriptor and the second extension descriptor includes a second value for the first property, the second value being different than the first value, and wherein identifying the one or more target platforms further includes identifying a third extension descriptor that extends the first extension descriptor, wherein the third extension descriptor includes a value for a second property that is included without a value defined in the deployment descriptor; and deploying the one or more software modules on the one or more target platforms, wherein deploying the one or more software modules includes implementing the at least one dependency identified in the deployment descriptor, and wherein deploying includes deploying the one or more software modules to the first set of one or more target platforms and to the second set of target platforms.

9. The system of claim 8, wherein each of the one or more software modules are associated with a type, wherein the type associated with a particular software module identifies a suitable target runtime environment on a particular target platform in which the particular software module can be deployed.

10. The system of claim 9, wherein identifying the one or more target platforms for deployment of the MTA includes identifying, for each of the one or more software modules, a target runtime environment associated with one of the one or more target platforms corresponding to the type of the particular software module.

11. The system of claim 8, wherein identifying the one or more target platforms for deployment includes identifying a first set of one or more target platforms referenced in a first extension descriptor that extends the deployment descriptor, and wherein deploying includes deploying the one or more software modules to the first set of one or more target platforms.

12. A computer program product encoded on a non-transitory storage medium, the product comprising non-transitory, computer readable instructions for causing one or more processors to perform operations comprising:

identifying a MTA (Multiple Target Application) for deployment, the MTA including one or more software modules, the MTA associated with a deployment descriptor that identifies at least one dependency associated with the one or more software modules;

identifying one or more target platforms for deployment of the MTA, wherein identifying the one or more target platforms for deployment includes identifying a first set of one or more target platforms referenced in a first extension descriptor that extends the deployment descriptor and identifying a second set of one or more target platforms included in a second extension descriptor that extends the deployment descriptor, the second extension descriptor being different than the first extension descriptor and the second set of one or more target platforms being different than the first set of one or more target platforms, wherein the first extension descriptor includes a first value for a first property included in the deployment descriptor and the second extension descriptor includes a second value for the first property, the second value being different than the first value, and wherein identifying the one or more target platforms further includes identifying a third extension descriptor that extends the first extension descriptor, wherein the third extension descriptor includes a value for a second property that is included without a value defined in the deployment descriptor; and deploying the one or more software modules on the one or more target platforms, wherein deploying the one or more software modules includes implementing the at least one dependency identified in the deployment descriptor, and wherein deploying includes deploying the one or more software modules to the first set of one or more target platforms and to the second set of target platforms.

13. The computer program product of claim 12, wherein each of the one or more software modules are associated with a type, wherein the type associated with a particular software module identifies a suitable target runtime environment on a particular target platform in which the particular software module can be deployed.

14. The computer program product of claim 13, wherein identifying the one or more target platforms for deployment of the MTA includes identifying, for each of the one or more software modules, a target runtime environment associated with one of the one or more target platforms corresponding to the type of the particular software module.

* * * * *